United States Patent
Shimizu et al.

(10) Patent No.: US 6,353,063 B1
(45) Date of Patent: Mar. 5, 2002

(54) PROCESS FOR PRODUCING OLEFIN POLYMER

(75) Inventors: Masafumi Shimizu; Yoshiyuki Ishihama; Akihira Watanabe, all of Mie (JP)

(73) Assignee: Japan Polychem Corporation, Tokyo (JP)

(*) Notice: Subject to any disclaimer, the term of this patent is extended or adjusted under 35 U.S.C. 154(b) by 0 days.

(21) Appl. No.: 09/508,513
(22) PCT Filed: Jul. 23, 1999
(86) PCT No.: PCT/JP99/03954
§ 371 Date: Mar. 24, 2000
§ 102(e) Date: Mar. 24, 2000
(87) PCT Pub. No.: WO00/05271
PCT Pub. Date: Feb. 3, 2000

(30) Foreign Application Priority Data

Jul. 24, 1998 (JP) .......................................... 10-209282

(51) Int. Cl.[7] .................................................. C08F 2/34
(52) U.S. Cl. .......................... 526/74; 526/901; 526/153; 526/129; 526/131; 526/943; 526/348.2; 526/348.5; 526/348.6; 526/160; 526/904
(58) Field of Search ........................... 526/901, 74, 129, 526/160, 131, 943, 348.2, 348.5, 348.6, 153, 904

(56) References Cited

U.S. PATENT DOCUMENTS 5,122,491 A * 6/1992 Kioka et al. ................. 502/117

* cited by examiner

Primary Examiner—David W. Wu
Assistant Examiner—William K Cheung
(74) Attorney, Agent, or Firm—Oblon, Spivak, McClelland, Maier & Neustadt, P.C.

(57) ABSTRACT

A process for producing a polyolefin in the presence of a transition metal-containing metallocene catalyst that maintains stable operation for long periods of time without suffering from adhesion of the produced polymer to the wall of a reactor or formation of a sheet-like polymer or a massive polymer. The process utilizes a transition metal-containing metallocene catalyst and an organoaluminum compound represented by formula: $R^1{}_n Al(OR^2)_{3-n}$, wherein $R^1$ represents a $C_{1-20}$ alkyl group, an aryl group, hydrogen or halogen; $R^2$ represents a $C_{1-20}$ alkyl group or an aryl group; and n is a number selected from $0 \leq n < 3$, under conditions such that the temperature of the wall of a polymerization reactor, Tw (° C.), and the polymerization temperature, Tr (° C.), satisfy the relationship: $0.5 < Tr - Tw < 10$.

11 Claims, 2 Drawing Sheets

PROCESS FOR PRODUCING OLEFIN POLYMER

TECHNICAL FIELD

This invention relates to a process for producing a polyolefin. More particularly, it relates to a process for polymerizing an olefin in the presence of a metallocene catalyst to produce a polyolefin in a stable manner over an extended period of time without suffering from adhesion of the product to the inner wall of the reactor or formation of a massive polymer.

BACKGROUND ART

Polyolefins exemplified by an ethylene polymer and a linear low-density polyethylene (L-LDPE), which is an ethylene-α-olefin copolymer, are widely used as a film-forming material, an injection molding material, etc. These polyolefins have conventionally been produced by homo- or copolymerizing an olefin(s) by solution polymerization, suspension polymerization, bulk polymerization or gas phase polymerization in the presence of a so-called Ziegler catalyst system composed mainly of titanium, magnesium and a halogen.

Where production of a polyolefin particularly by gas phase polymerization, bulk polymerization or slurry polymerization is carried on for a long period of time, the product polymer tends to adhere to the wall or a stirring blade of a reactor. Cases are met with in which the adhered polymer melts to form a sheet-like polymer or a massive polymer that will clog the product discharge line and hinders the operation.

In order to avoid such operational trouble, it has been proposed to add an alcohol, a ketone, etc. (see JP-A-1-230607), water (see JP-B-7-5665) or a mixture of an alcohol phosphate and a quaternary ammonium salt (see JP-A-6-172412) to the reaction system, to charge water-containing particles (see JP-A-4-85307) or oxygen-containing particles (see JP-A-4-85308) into the reactor prior to the commencement of polymerization.

In addition to the Ziegler catalyst system, a catalyst system comprising a metallocene compound of the group 4 metal, such as zirconium or titanium has recently been developed (see JP-B-4-12283, etc.). The metallocene catalyst system has now been attracting attention, for the polymers obtained have such advantages that could not be observed with those obtained by using a conventional Ziegler catalyst. For example, the polymers obtained by using the metallocene catalyst have a reduced proportion of a low crystalline component, which is in favor of anti-blocking, and can have their processability controlled by introducing long-chain branches therein.

However, polyolefin production by gas phase polymerization, bulk polymerization or slurry polymerization in the presence of the metallocene catalyst cannot get rid of the above-described problems, i.e., adhesion of the product polymer to the reactor's wall and a stirring blade and formation of a sheet-like polymer or a massive polymer. These obstacles to stable operation are common to the conventional Ziegler catalyst and the metallocene catalyst.

With respect to the metallocene catalyst, it is known that at least one compound selected from water, alcohols and ketones is added to the reaction system to improve the flowability of the polymer produced (see JP-A-7-76604). With this manipulation, however, operational hindrance due to formation of a sheet-like polymer or a massive polymer is still encountered frequently. Therefore, it has been demanded to develop a novel technique for achieving operational stabilization

DISCLOSURE OF THE INVENTION

The inventors of the present invention has found a method for realizing stable operation in producing a polyolefin using a transition metal-containing metallocene catalyst for an extended period of time which is not accompanied by formation of a sheet-like polymer or a massive polymer. The invention has thus been completed.

It is an object of the present invention to make it feasible to carry on stable operations for a long period of time in polymerizing an olefin in the presence of a transition metal-containing metallocene catalyst without involving adhesion of the produced polymer to the wall of a reactor or formation of a sheet-like polymer or a massive polymer.

The invention has been reached as a result of extensive study aiming at accomplishment of the above object. The invention provides a process for producing a polyolefin comprising polymerizing an olefin in the presence of [A] a transition metal-containing metallocene catalyst and [B] an organoaluminum compound represented by formula:

$$R^1_n Al(OR^2)_{3-n}$$

wherein $R^1$ represents a $C_{1-20}$ alkyl group, an aryl group, hydrogen, or halogen; $R^2$ represents a $C_{1-20}$ alkyl group, or an aryl group; and n represents a number of $0 \leq n < 3$, under such a condition that the temperature (Tw(° C.)) of the wall of a polymerization reactor and the polymerization temperature (Tr(° C.)) satisfy the relationship of the following formula 1: $0.5 < Tr - Tw < 10$.

BEST MODE FOR CARRYING OUT THE PRESENT INVENTION

The process for polymerizing an olefin according to the present invention will hereinafter be described in detail. The term "polymerizing" or "polymerization" as used herein is intended to mean both homopolymerization of a single monomer and copolymerization of two or more monomers. Accordingly, the term "polymer" as used herein denotes both a homopolymer and a copolymer.

"Stabilization of operations" or a like expression as used herein is intended to mean that operations of olefin polymerization can be carried on for an extended period of time without suffering from formation of a molten polymer, such as a sheet-like polymer or a massive polymer, nor adhesion of the produced polymer to the wall or the stirring blade of a reactor.

<Catalyst>
[A] Transition Metal-containing Metallocene Catalyst

The transition metal-containing metallocene catalyst as component [A] is composed of [a1] a transition metal-containing metallocene compound and at least one component selected from the group consisting of [a2] clay, clay mineral or an ion exchangeable layer compound (layered compound), [a3] an organoaluminumoxy compound supported on a carrier, and [a4] a boron anionic compound supported on a carrier.

Components [a1], [a2], [a3] and [a4] will be explained below.

[a1] Metallocene Compound

The metallocene compound [a1] used in the present invention is a transition metal-containing metallocene containing the metal belonging to the group 4, 5 or 6 of the Long-form Periodic Table which is represented by formula (1):

(1)

wherein two $(CpR^{12}_j)$'s, which may be the same or different, each represent a substituted or unsubstituted cyclopentadienyl group; $R^{11}$ represents a covalent linking group containing the group 14 or 15 element of the Long-form Periodic Table, such as carbon, silicon or germanium; two $R^{12}$'s, which may be the same or different, each represent a hydrogen atom, a halogen atom, a silicon-containing group, a hydrocarbon group containing 1 to 20 carbon atoms which may have a halogen substituent, an alkoxy group or an aryloxy group; two $R^{12}$'s that are on adjacent carbon atoms of the cyclopentadienyl ring may be connected together to form a ring having 4 to 7 carbon atoms; two $R^{13}$'s, which may be the same or different, each represent a hydrogen atom, a halogen atom, a hydrocarbon group having 1 to 20 carbon atoms, a halogen-containing hydrocarbon group, a silicon-containing group, an alkoxy group or an aryloxy group; i represents 0 or 1; j's each represent an integer making the sum of i and j, 5; and M represents the group 4, 5 or 6 metal of the Long-form Periodic Table.

In formula (1), $R^{11}$ is a covalent linking group containing the group 14 or 15 element of the Long-form Periodic Table, such as carbon, silicon or germanium, which bridges the two cyclopentadienyl ring-containing groups represented by $CpR^{12}_j$. Examples of suitable covalent linking groups $R^{11}$ include an alkylene group (e.g., methylene group or ethylene group), an alkylidene group (e.g., ethylidene group, propylidene group, isopropylidene group, phenylmethylidene group or diphenylmethylidene group), a silicon-containing linking group (e.g., dimethylsilylene group, diethylsilylene group, dipropylsilylene group, diisopropylsilylene group, diphenylsilylene group, methylethylsilylene group, methylphenylsilylene group, methylisopropylsilylene group or methyl-t-butylsilylene group), a germanium-containing linking group (e.g., dimethylgermylenegroup, diisopropylgermylene group, diphenylgermylene group, methylethylgermaylene group, methylphenylgermylene group, methylisopropylgermylene group or methyl-t-butylgermylene group), an alkylphosphine, and an amine. Of these covalent linking groups preferred are an alkylene group, an alkylidene group, and a silicon-containing linking group.

The two $(CpR^{12}_j)$'s may be the same or different and each represent a substituted or unsubstituted cyclopentadienyl group, in which $R^{12}$ represents a hydrogen atom, a halogen atom (e.g., fluorine, chlorine, bromine or iodine), a silicon-containing group (e.g., trimethylsilyl, triethylsilyl or triphenylsilyl), a hydrocarbon group containing 1 to 20 carbon atoms which may have a halogen substituent (e g., methyl, ethyl, propyl, butyl, isobutyl, pentyl, isopentyl, hexyl, heptyl, octyl, nonyl, decyl, phenyl, chloromethyl or chloroethyl), an alkoxy group (e.g., methoxy, ethoxy, propoxy or butoxy) or an aryloxy group (e.g., phenoxy, methylphenoxy or pentamethylphenoxy).

Where two $R^{12}$'s are on two adjacent carbon atoms of the cyclopentadienyl ring, they can be connected to each other to form a ring having 4 to 7 carbon atoms, such as an indenyl, tetrahydroindenyl, fluorenyl, octahydrofluorenyl, azulenyl or hexahydro azulenyl group. It is preferred that each $R^{12}$ is a hydrogen atom or a methyl group or two $R^{12}$'s are connected to each other to form an indenyl, tetrahydroindenyl, fluorenyl, octahydrofluorenyl, azulenyl or hexahydro azulenyl group.

Two $R^{13}$'s, which may be the same or different, each represent a hydrogen atom, a halogen atom (e.g., fluorine, chlorine, bromine or iodine), a silicon-containing group (e.g., trimethylsilyl, triethylsilyl or triphenylsilyl), a hydrocarbon group having 1 to 20 carbon atoms which may have a halogen atom (e.g., methyl, ethyl, propyl, butyl, isobutyl, pentyl, isopentyl, hexyl, heptyl, octyl, nonyl, decyl, phenyl, chloromethyl or chloroethyl), an alkoxy group (e.g., methoxy, ethoxy, propoxy or butoxy) or an aryloxy group (e.g., phenoxy, methylphenoxy or pentamethylphenoxy). A hydrogen atom, a chlorine atom or a methyl group is particularly preferred.

Where the two cyclopentadienyl rings are not linked via $R^{11}$, i.e., i=0, j is 5. Where the two cyclopentadienyl rings are linked via $R^{11}$, i.e., i=1, j is 4.

M is a metal belonging to the groups 4, 5 or 6 of the Long-form Periodic Table, e.g., Ti, Zr, Hf, V, Nb, Ta, Cr, Mo, W, etc. Ti, Zr and Hf are particularly preferred.

Specific examples of the above-mentioned transition metal-containing metallocene compounds corresponding to formula (1), when giving examples of zirconium as M, for instance, are isopropylidenebis(indenyl)zirconium dichloride, isopropylidenebis(indenyl)zirconium dimethyl, isopropylidenebis(indenyl)zirconium dihydride, isopropylidene(cyclopentadienyl)(fluorenyl)zirconium dichloride, isopropylidene(cyclopentadienyl)(fluorenyl) zirconium dimethyl, dimethylsilyl(cyclopentadienyl) (fluorenyl)zirconium dimethyl, isopropylidene (cyclopentadienyl)(fluorenyl)zirconium dihydride, methylenebis(cyclopentadienyl) zirconium dichloride, methylenebis(tetramethylcyclopentadienyl)zirconium dichloride, ethylenebis(cyclopentadienyl)zirconium dichloride, isopropylidenebis(cylcopentadienyl)zirconium dichloride, dimethylsilylbis(cyclopentadienyl)zirconium dichloride, methylenebis(cyclopentadienyl)zirconium dimethyl, methylenebis(tetramethylycopentadienyl) zirconium dimethyl, ethylenebis(cyclopentadienyl) zirconium dimethyl, isopropylidenebis(cyclopentadienyl) zirconium dimethyl, dimethylsilylbis(cyclopentadienyl) zirconium dimethyl, methylenebis(cyclopentadienyl) zirconium dihydride, ethylenebis(cyclopentadienyl) zirconium dihydride, isopropylidenebis(cyclopentadienyl) zirconium dihydride, dimethylsilylbis(cyclopentadienyl) zirconium dihydride, bis(n-butylcyclopentadienyl) zirconium dichloride, bis(n-butylmethylcyclopentadienyl) zirconium dichloride, bis(n-butylcyclopentadienyl)hafnium dichloride, dimethylsilylenebis(4-methyl-4-hydro-azulenyl) zirconium dichloride, dimethysilylenebis(2,4-dimethyl-4-hydro-azulenyl)zirconium dichloride, dimethylsilylenebis [1, 1'-{2-methyl-4-(4-chlorophenyl)-4-hydro-azulenyl}] zirconium dichloride, dimethylsilylenebis{1, 1'-(2-methyl-4-phenyl-4-hydro-azulenyl)}zirconium dichloride, and dimethylsilylenebis{1, 1'-(2-methyl-4-phenyl-4-hydro-azulenyl)}hafnium dichloride.

The above-enumerated examples for zirconium compounds apply to the compounds of other metals of the groups 4, 5 and 6, such as titanium and hafnium. The metallocene compounds represented by formula (1) can be used either individually or as a combination of two or more thereof as component [a1]. The component [a1] can be used in combination with known solid catalysts mainly comprising titanium trichloride or catalysts-on-carrier containing magnesium, titanium and halogen as essential components.

[a2] Clay, Clay Mineral or an Ion Exchangeable Layer Compound

Component [a1] is usually used together with [a2] clay, clay mineral or an ion exchangeable layer compound. Clay is usually composed mainly of clay minerals. The ion exchangeable layer compound is a compound having a crystal structure in which atoms are bonded to form a plurality of planes which are stacked in parallel with a weak bonding force through an ionic bond, etc. and containing exchangeable ions. Most of clay minerals are ion exchangeable layer compounds. The clay, clay minerals and ion exchangeable layer compounds may be either naturally occurring or artificial.

Specific examples of component [a2] include kaoline minerals, such as dickite, nacrite, kaolinite, anauxite, metahalloysite, and halloysite; serpentine minerals, such as chrysotile, lizardite, and antigorite; smectite group minerals, such as montmorillonite, sauconite, beidellite, nontronite, saponite, taeoniolite, hectorite, and stevensite; vermiculite minerals, such as vermiculite; mica group minerals, such as mica, illite, sericite, and glauconite; attapulgite, sepiolite, palygorskite, bentonite, pyrophyllite, talc, and chlorite group minerals. These minerals may form mixed layers in combination. Preferred of them are smectite group minerals, such as montmorillonite, sauconite, beidellite, nontronite, saponite, hectorite, stevensite, bentonite, and taeniolite, vermiculite minerals, and mica group minerals.

It is preferred for component [a2] be subjected to a chemical treatment for removing impurities attached to the surface or for affecting the crystal structure of the clay, such as an acid treatment, an alkali treatment, a salt treatment, or an organic treatment. An acid treatment is effective in not only removing surface impurities but dissolving cations of the crystal structure, e.g., Al, Fe, and Mg ions, to increase the surface area. An alkali treatment destroys the crystal structure of clay to change the structure of the clay.

A salt treatment and an organic treatment are to form an ion complex, a molecule complex, an organic derivative, and the like to change the surface area or the interlayer distance. For example, taking advantage of the ion exchanging properties, the above-described layer compounds can have the interlayer exchangeable ions displaced with bulkier ions so as to have an increased interlayer distance. The bulky ions serve to bear the layer structure and called pillars.

We call the introduction of another substance between among layers of the layer compounds, as intercalation. Guest compounds that can be intercalated include cationic inorganic compounds, such as $TiCl_4$ and $ZrCl_4$; metal alcoholates, such as $Ti(OR)_4$, $Zr(OR)_4$, $PO(OR)_4$, $B(OR)_4$ (R: alkyl or aryl); and metal hydroxide ions, such as $[Al_{13}O_4(OH)_{24}]^{7+}$, $[Zr_4(OH)_{14}]^{2+}$, and $[Fe_3O(OCOCH_3)_6]^+$. These guest compounds can be used either individually or as a combination of two or more thereof. Intercalation can be effected in the presence of a polymer obtained by hydrolysis of a metal alcoholate (e.g., $Si(OR)_4$, $Al(OR)_3$ or $Ge(OR)_4$), a colloidal inorganic compound (e.g., $SiO_2$), etc. The pillar includes an oxide formed by intercalating the above-described hydroxide ions followed by heating to dehydrate.

Of the above-mentioned chemical treatments preferred are a salt treatment and/or an acid treatment. Acid strength of a solid catalyst can be changed by a salt treatment and/or an acid treatment. A salt treatment is to form an ion complex, a molecule complex, an organic derivative, and the like to change the surface area or the interlayer distance. That is, the ion exchanging properties can be taken advantage of to displace the interlayer exchangeable ions with bulkier ions so as to have an increased interlayer distance. In the invention, it is preferable that 30% or more, preferably 40% or more, particularly preferably 60% or more, of exchangeable cations possessed by at least one compound selected from the ion exchangeable layer compound group be exchanged for the cation dissociated from a salt used in the salt treatment. The salt which can be used in the salt treatment for ion exchange is a compound having a cation containing at least one atom selected from the group consisting of the elements belonging to groups 2 to 14 of the Long-form Periodic Table.

Such a salt includes:
(1) $CaCl_2$, $CaSO_4$, $CaC_2O_4$, $Ca(NO_3)_2$, $Ca_3(C_6H_5O_7)_2$,
(2) $MgCl_2$, $MgBr_2$, $MgSO_4$, $Mg(PO_4)_2$, $Mg(ClO_4)_2$, $MgC_2O_4$, $Mg(NO_3)_2$, $Mg(OOCCH_3)_2$, $MgC_4H_4O_4$,
(3) $Sc(OOCCH_3)_3$, $Sc\ (CO_3)_3$, $Sc_2(C_2O_4)_3$, $Sc\ (NO_3)_3$, $Sc_2(SO_4)_3$, $ScF_3$, $ScCl_3$, $ScBr_3$, $ScI_3$,
(4) $Y(OOCCH_3)_3$, $Y(CH_3COCHCOCH_3)_3$, $Y_2(CO_3)_3$, $Y_2(C_2O_4)_3$, $Y(NO_3)_3$, $Y(ClO_4)_3$, $YPO_4$, $Y_2(CO_4)_3$, $YF_3$, $YCl_3$,
(5) $La(OOCCH_3)_3$, $La\ (CH_3COCHCOCH_3)_3$, $La_2(CO_3)_3$, $La\ (NO_3)_3$, $La\ (ClO_4)_3$, $La_2(C_2O_4)_3$, $LaPO_4$, $La_2(SO_4)_3$, $LaF_3$, $LaCl_3$, $LaBr_3$, $LaI_3$,
(6) $Sm(OOCCH_3)_3$, $Sm(CH_3COCHCOCH_3)_3$, $Sm_2(CO_3)_3$, $Sm(NO_3)_3$, $Sm(ClO_4)_3$, $Sm_2(C_2O_4)_3$, $Sm_2(SO_4)_3$, $SmF_3$, $SmCl_3$, $SmI_3$,
(7) $Yb(OOCCH_3)_3$, $Yb(NO_3)_3$, $Yb(ClO_4)_3$, $Yb(C_2O_4)_3$, $YB(SO_4)_3$, $YbF_3$, $YbCl_3$,
(8) $TiF_4$, $TiCl_4$, $TiBr_4$, $TiI_4$, $TiOCl_2$, $Ti(SO_4)_2$, $Ti(NO_3)_4$, $TiO(NO_3)_2$, $Ti_3(PO_4)_4$, $Ti(ClO_4)_4$, $Ti(CO_3)_2$, $Ti(OCOH)_4$, $Ti(OCOCH_3)_4$, $Ti(OCOC_2H_5)_4$, $Ti(OCOC_3H_7)_4$, $Ti((COO)_2)_2$, $Ti(CH_2(COO)_2)_2$, $TiBrCl_3$, $TiF_3$, $TiCl_3$, $TiBr_3$, $TiI_3$, $Ti(NO_3)_3$, $Ti(ClO_4)_3$,
(9) $Zr(OOCCH_3)_4$, $Zr(CO_3)_2$, $Zr(NO_3)_4$, $Zr(SO_4)_2$, $ZrF_4$, $ZrCl_4$, $ZrBr_4$, $ZrI_4$, $ZrOCl_2$, $ZrO(NO_3)_2$, $ZrO(ClO_4)_2$, $ZrO(SO_4)$,
(10) $Hf(OOCCH_3)_4$, $Hf(CO_3)_2$, $Hf(NO_3)_4$, $Hf(SO_4)_2$, $HfOCl_2$, $HfF_4$, $HfCl_4$, $HfBr_4$, $HfI_4$,
(11) $V(CH_3COCHCOCH_3)_3$, $VOSO_4$, $VOCl_3$, $VCl_3$, $VBr_3$,
(12) $Nb(CH_3COCHCOCH_3)_5$, $Nb_2(CO_3)_5$, $Nb_2(NO_3)_5$, $Nb_2(SO_4)_5$, $NbF_5$, $NbCl_5$, $NbBr_5$, $NbI_5$,
(13) $Ta(OOCCH_3)_5$, $Ta_2(CO_3)_5$, $Ta(NO_3)_5$, $Ta_2(SO_4)_5$, $TaF_5TaCl_5$, $TaBr_5$, $TaI_5$,
(14) $Cr(CH_3COCHCOCH_3)_3$, $Cr\ (OOCH)_2OH$, $Cr(NO_3)_3$, $Cr(ClO_4)_3$, $CrPO_4$, $Cr_2(SO_4)_3$, $CrO_2Cl_2$, $CrF_3$, $CrCl_3$, $CrBr_3$, $CrI_3$,
(15) $MoOCl_4$, $MoCl_3$, $MoCl_4$, $MoCl_5$, $MoF_6$, $MoI_2$,
(16) $WCl_4$, $WCl_6$, $WF_6$, $WBr_6$,
(17) $Mn(OOCCH_3)_2$, $Mn\ (CH_3COCHCOCH_3)_2$, $MnCO_3$, $Mn\ (NO_3)_2$, $MnO\ Mn\ (ClO_4)_2$, $MnF_2$, $MnCl_2$, $MnBr_2$, $MnI_2$,
(18) $Fe(OOCCH_3)_2$, $Fe(CH_3COCHCOCH_3)_3$, $FeCO_3$, $Fe(NO_3)_3$, $Fe(ClO_4)_3$, $FePO_4$, $FeSO_4$, $Fe_2(SO_4)_3$, $FeF_3$, $FeCl_3$, $FeBr_3$, $FeI_3$, $FeC_6H_5H_7$,
(19) $Co(OOCCH_3)_2$, $Co(CH_3COCHCOCH_3)_3$, $CoCO_3$, $Co(NO_3)_2$, $COC_2O_4$, $Co(ClO_4)_2$, $Co_3(PO_4)_2$, $CoSO_4$, $CoF_2$, $CoCl_2$, $CoBr_2$, $CoI_2$,
(20) $NiCO_3$, $Ni(NO_3)_2$, $NiC_2O_4$, $Ni(ClO_4)_2$, $NiSO_4$, $NiCl_2$, $NiBr_2$,
(21) $Pb(OOCCH_3)_2$, $PbCO_3$, $Pb(NO_3)_2$, $PbHPO_4$, $PbSO_4$, $Pb(ClO_4)_2$, $PbF_2$, $PbCl_2$, $PbBr_2$, $PbI_2$,
(22) $CuCl_2$, $CuBr_2$, $Cu(NO_3)_2$, $CuC_2O_4$, $CU(ClO_4)_2$, $CUSO_4$, $Cu(OOCCH_3)_2$,
(23) $Zn(OOCCH_3)_2$, $Zn(CH_3COCHCOCH_3)_2$, $Zn(OOCH_3)_2$, $ZnCO_3$, $Zn(NO_3)_2$, $Zn(ClO_4)_2$, $Zn_3(PO_4)_2$, $ZnSO_4$, $ZnF_2$, $ZnCl_2$, $ZnBr_2$, $ZnI_2$,
(24) $Cd(OOCCH_3)_2$, $Cd(CH_3COCHCOCH_3)_2$, $Cd(OCOCH_2CH_3)_2$, $Cd(NO_3)_2$, $Cd(ClO_4)_2$, $CdSO_4$, $CdF_2$, $CdCl_2$, $CdBr_2$, $CdI_2$, (25) $AlF_3$, $AlCl_3$, $AlBr_3$, $AlI_3$, $Al_2(SO_4)_3$, $Al_2(C_2O_4)_3$, $Al(CH_3COCHCOCH_3)_3$, $Al(NO_3)_3$, $AlPO_4$, (26) $GeCl_4$, $GeBr_4$, $GeI_4$, (27) $Sn(OOCCH_3)_4$, $Sn(SO_4)_2$, $SnF_4$, $SnCl_4$, $SnBr_4$, $SnI_4$, (28) $Pb(OOCCH_3)_4$, $PbCO_3$, $Pb(NO_3)_2$, $PbHPO_4$, $Pb(ClO_4)_2$, $PbSO_4$, $PbF_2$, $PbCl_2$, $PbBr_2$, and $PbI_2$.

Preferred of the salts are those containing a cation of the group 4, 5 or 6 transition metal, i.e., $Ti^{2+}$, $Ti^{3+}$, $Ti^{4+}$, $Zr^{2+}$, $Zr^{3+}$, $Zr^{4+,Hf2+}$, $Hf^+$, $Hf^{4+}$, $V^{2+}$, $V^{3+}$, $V^{4+}$, $V^{5+}$, $Nb^{2+}$, $Nb^{3+}$, $Nb^{4+}$, $Nb^{5+}$, $Ta^{2+}$, $Ta^{3+}$, $Ta^{4+}$, $Ta^{5+}$, $Cr^{2+}$, $Cr^{3+}$, $Cr^{4+}$, $Cr^{5+}$, $Cr^{6+}$, $Mo^{2+}$, $Mo^{3+}$, $Mo^{4+}$, $Mo^{5+}$, $Mo^{6+}$, $W^{2+}$, $W^{3+}$, $W^{4+}$, $W^{5+}$ or $W^{6+}$. These salts can be used individually or as a combination thereof either simultaneously and/or successively.

The acid treatment is to remove the surface impurities and to dissolve a part or the whole of the cations (e.g., Al, Fe, Mg) of the crystal structure. The acid to be used is preferably selected from hydrochloric acid, sulfuric acid, nitric acid, acetic acid and oxalic acid. The salts or the acids used in the treatment can be used in combination of two or more thereof. Where a salt treatment and an acid treatment are combined, a salt treatment can precede or follow an acid treatment, or the two treatments can be effected simultaneously.

The conditions for carrying out the salt treatment and/or the acid treatment are desirably selected so that at least part of the substance making up at least one compound selected from the ion exchangeable layer compound group may be dissolved. While not limiting, such conditions are usually selected from a salt or acid concentration of from 0.1 to 30% by weight, a temperature of from room temperature up to the boiling point of the system, and a treating time of from 5 minutes to 24 hours. While not limiting, the salt or acid is generally used in the form of an aqueous solution.

It is preferred for the component [a2] thus treated to satisfy the following condition (i) so that the catalyst system obtained exhibits satisfactory fluidity and that the resulting polyolefin has a high bulk density with reduced fine particles or coarse particles. It is particularly preferred for the component [a2] to satisfy all the following conditions (i) to (iii):

(i) To have an average particle size of 20 to 1,000 μm with the number of the particles having a diameter of 10 μm or smaller being not more than 20% based on the total particles.

(ii) To have a compressive strength of 0.5 MPa or higher as measured with a microcompression tester.

(iii) To have a bulk density of 0.6 g/cm³ or more.

With reference to condition (i), which is concerned with the average particle size and the particle-size distribution of component [a2], a particularly preferred average particle size is 20 to 500 μm, especially 20 to 100 μm, and a particularly preferred proportion of particles of 10 μm or smaller is 15% or less, especially 10% or less, in number. It is preferred that either one of the above conditions about the average particle size and about the particle-size distribution or both of them be satisfied. The particle size as referred to herein can be measured with a particle-size distribution measuring apparatus by laser diffractometry (LMS 024, manufactured by Seisin Kigyousha K.K.; light source: semiconductor laser (wavelength: 670 nm)). In the measurement, ethanol was used as a dispersing medium, and the particle-size distribution and the average particle size were calculated, setting the refractive index at 1.33 and the form factor at 1.0.

With respect to condition (ii), which is concerned with the strength of component [a2], a particularly preferred compressive strength measured with a microcompression tester is 1.0 MPa or greater. The upper limit of the compressive strength is 40 MPa. The compressive strength as referred to here is the average of values as measured with a microscopic compressing tester MCTM-500 (manufactured by Shimadzu Corp.) on 10 or more arbitrarily selected particles.

With respect to condition (iii), which is concerned with the bulk density of component [a2], a particularly preferred bulk density is 0.6 g/cm³ or more. The upper limit of the bulk density is 1.5 g/cm³.

The component [a2] satisfying conditions (i), (ii) and (iii) may be produced by controlling granularity by pulverization, granulation, sizing, separation, etc., before, during or after treatment, when the above-exemplified clay, clay mineral or an ion exchangeable layer compound is subjected to the above-mentioned salt treatment and/or acid treatment. Any method may be used if it is appropriate for attaining the purpose. When the granulation methods are mentioned especially, they include spray granulation method, tumbling granulation method, compression granulation method, agitation granulation method, briquetting method, compacting method, extrusion granulation method, fluidized bed granulation method, emulsion granulation method and submerged granulation method. Especially preferred granulation methods are spray granulation method, tumbling granulation method and compression granulation method. The above-mentioned clay, clay mineral, and ion exchangeable layer compound may be used singly or in combination.

[a3] Organoaluminumoxy Compound

Next, [a3] the organoaluminumoxy compound is explained. Here, the organoaluminumoxy compound is a compound represented by formula (2) or (3):

In the above-mentioned formula (2) and (3), $R^{21}$ is a $C_{1-8}$ alkyl group, and r is an integer of 0 or more.

These [a3] components are obtained by the reaction between a kind of a trialkylaluminum or a mixture of two or more kinds of trialkylaluminums and water. They include (i) those obtained from a kind of a trialkylaluminum and water, such as methylalumoxane, ethylalumoxane, butylalumoxane, and isobutylalumoxane, and (ii) those obtained from two kinds of trialkylaluminums and water, such as methylethylalumoxane, methylbutylalumoxane, and methylisobutylalumoxane.

Preferred of them are methylalumoxane, isobutylalumoxane, methylisobutylalumoxane, and a mixture of these alumoxanes. Particularly preferred are methylalumoxane and methylisobutylalumoxane.

If desired, the organoaluminumoxy compound can be used as supported on a carrier, such as silica gel or alumina. Methylalumoxane-on-silica gel is particularly preferred.

The reaction for preparing alumoxane compounds can be carried out in various modes. For example, the alumoxane compound can be obtained by (i) allowing a trialkylaluminum to react directly with water in an appropriate organic solvent, such as toluene, benzene or diethyl ether, (ii) allowing a trialkylaluminum to react with a salt hydrate containing water of crystallization, such as copper sulfate hydrate or aluminum sulfate hydrate, (iii) allowing a trialkylaluminum to react with the impregnating water content of silica gel, etc., (iv) allowing a mixture of trimethylaluminum and triisobutylaluminum to react directly with water in an appropriate solvent, such as toluene, benzene or diethyl ether, (v) allowing a mixture of trimethylaluminum and triisobutylaluminum to react with a salt hydrate having water of crystallization, such as copper sulfate hydrate or aluminum sulfate hydrate, under heating, (vi) impregnating silica gel, etc. with water and treating the hydrated silica gel, etc. successively with triisobutylaluminum and trimethylaluminum.

[a4] Boron Anionic Compound

Next, the case where [a4] boron anionic compound is used is explained. Where component [a1] is combined with component [a4], the transition metal-containing metallocene catalyst [A] can be represented by formula (4):

$$[R^{11}{}_i(CpR^{12}{}_j)(CpR^{12}{}_j)MR^{13}R^{14}]^{+R15-} \qquad (4)$$

wherein $R^{11}{}_i$, $(CpR^{12}{}_j)$, M, and $R^{13}$ are as defined as for formula (1); i.e., $R^{11}$ represents a covalent linking group containing the group 14 or 15 element of the Long-form Periodic Table (e.g., carbon, silicon or germanium); two $R^{12}$'s, which may be the same or different, each represent a hydrogen atom, a halogen atom, a silicon-containing group, a hydrocarbon group containing 1 to 20 carbon atoms which may have a halogen substituent, an alkoxy group or an aryloxy group; two $R^{13}$'s, which may be the same or different, each represent a hydrogen atom, a halogen atom, a hydrocarbon group having 1 to 20 carbon atoms, a halogen-containing hydrocarbon group, a silicon-containing group, an alkoxy group or an aryloxy group; M represents the group 4, 5 or 6 metal of the Long-form Periodic Table; i represents 0 or 1; j's each represent an integer making (i+j) 5.

Furthermore, $R^{14}$ represents a neutral ligand coordinating to M (e.g., tetrahydrofuran). $R^{15}$ represents a counter anion neutralizing the metal cation of formula (4). In formula (4), the anion as $R^{15}$ corresponds to compound [a4], a boron anionic compound, such as tetraphenyl borate, tetra(p-tolyl) borate, carbadodecaborate, and dicarbaundecaborate.

Examples of the catalyst [A] corresponding to formula (4) specifically includes an isopropylidenebis(indenyl) zirconium chloride (tetraphenyl borate)tetrahydrofuran complex, an isopropylidenebis(indenyl)zirconiummethyl (tetraphenyl borate)tetrahydrofuran complex, an isopropylidenebis(indenyl)zirconium hydride(tetraphenyl borate)tetrahydrofuran complex, an isopropylidene (cyclopentadienyl)(fluorenyl)zirconium chloride (tetraphenyl borate)tetrahydrofuran complex, an isopropylidene(cyclopentadienyl)(fluorenyl) zirconiummethyl (tetraphenyl borate)tetrahydrofuran complex, an isopropylidene(cyclopentadienyl)(fluorenyl) zirconium hydride (tetraphenyl borate)tetrahydrofuran complex, a methylenebis(cyclopentadienyl)zirconium chloride(tetraphenyl borate)tetrahydrofuran complex, an ethylenebis(cyclopentadienyl)zirconium chloride (tetraphenyl borate)tetrahydrofuran complex, an isopropylidenebis(cyclopentadienyl)zirconium chloride (tetraphenyl borate)tetrahydrofuran complex, a dimethylsilylbis(cyclopentadienyl)zirconium chloride (tetraphenyl borate)tetrahydrofuran complex, a methylenebis(cyclopentadienyl)zirconiummethyl tetraphenyl borate)tetrahydrofuran complex, an ethylenebis (cyclopentadienyl)zirconiummethyl(tetraphenyl borate) tetrahydrofuran complex, an isopropylidenebis (cyclopentadienyl)zirconiummethyl(tetraphenyl borate) tetrahydrofuran complex, a dimethylsilylbis (cyclopentadienyl)zirconiummethyl(tetraphenyl borate) tetrahydrofuran complex, a methylenebis(cyclopentadienyl) zirconium hydride(tetraphenyl borate)tetrahydrofuran complex, an ethylenebis(cyclopentadienyl)zirconium hydride(tetraphenyl borate)tetrahydrofuran complex, an isopropylidenebis(cyclopentadienyl)zirconium hydride (tetraphenyl borate)tetrahydrofuran complex, and a diemthylsilylbis(cyclopentadienyl)zirconium hydride (tetraphenyl borate)tetrahydrofuran complex.

Furthermore, these boron anionic compounds may be used by being supported on silica gel or alumina.

[a5] Organoaluminum Compound

The organoaluminum compound as catalyst component [a5] is represented by formula (5):

$$R^3{}_m Al(X_{3-m}) \qquad (5)$$

wherein $R^3$ represents an alkyl group having 1 to 20 carbon atoms; X represents a hydrogen atom, a halogen atom, an alkoxy group, an alkylsilyl group, an alkylsiloxy group, an alkylamino group or an alkylamido group; m represents a number greater than 0 and smaller than 3.

Specific examples of the [a5] components include trialkylaluminum compounds, such as trimethylaluminum, triethylaluminum, tripropylaluminum, tri(n-butyl)aluminum triisobutylaluminum, tri(t-butyl)aluminum, tripentylaluminum, trioctylaluminum, tridecylaluminum, tricyclohexylaluminum, and tricyclooctylaluminum; dialkylaluminum halides, such as dimethylaluminum chloride, diethylaluminum chloride, diethylaluminum bromide, and diisobutylaluminum chloride; and dialkylaluminum hydrides, such as diethylaluminum hydride and diisobutylaluminumhydride. Of them, trialkylaluminum is prefered, and triethylaluminum and triisobutylaluminum are especially preferred.

Although the organoaluminum compound of formula (5) wherein X is an alkoxy group is included under component [B], component [a5] is added separately from component [B] which is added to serve for stabilization of operations. Therefore, where component [a5] is used in the invention, it is added independently of component [B], which is added in an amount of 0.0001 to 10,000 nmol, preferably 0.001 to 5,000 nmol, still preferably 0.01 to 1,000 nmol, per gram of the polymer produced and discharged from the reactor as hereinafter described.

Component [a5] is usually fed to the reaction system by a combination of previous contact with the catalyst and supply to a circulation line during polymerization, but the manner of feeding is not particularly limited. For example, any of the following feeding methods can be adopted.

(1) Component [a5] is fed to a circulation line.
(2) Component [a5] is fed to a raw material feed line.
(3) Component [a5] is fed to a line feeding a transition metal-containing metallocene catalyst.
(4) Component [a5] is previously added to a transition metal-containing metallocene catalyst, as a catalyst component.
(5) The above methods (1) to (4) are combined.

[B] Organoaluminum Compound (Alkoxy-containing)

The organoaluminum compound which can be used as component [B] is an alkoxy-containing organoaluminum compound represented by formula (6):

$$R^1{}_n Al(OR^2)_{3-n} \qquad (6)$$

wherein $R^1$ represents a hydrogen atom, a halogen atom, an alkyl group having 1 to 20 carbon atoms or an aryl group;

$R^2$ represents an alkyl group having 1 to 20 carbon atoms or an aryl group; and n represents a number of 0 or greater and smaller than 3.

Specific examples of component [B] include (1) monoalkoxy- or monoaryloxy-containing aluminum compounds, such as dimethylaluminum methoxide, diethylaluminum ethoxide, diisopropylaluminum isopropoxide, diethylaluminum isopropoxide, and diethylaluminum phenoxide, (2) dialkoxy- or diaryloxy-containing aluminum compounds, such as methylaluminum dimethoxide, ethylaluminum diethoxide, isopropylaluminum diisopropoxide, ethylaluminum diisopropoxide, and ethylaluminum diphenoxide, or mixtures thereof with a dialkylaluminum alkoxide, a diarylaluminum alkoxide, a dialkylaluminum aryloxide or a diarylaluminum aryloxide, and (3) trialkoxide- or triaryloxide-containing aluminum compounds, such as aluminum trimethoxide, aluminum triethoxide, aluminum triisopropoxide, and aluminum triphenoxide, or mixtures thereof with a dialkylaluminum alkoxide, a diarylaluminum alkoxide, a dialkylaluminum aryloxide, a diarylaluminum aryloxide, an alkylaluminum dialkoxide, an arylaluminum dialkoxide, an alkylaluminum diaryloxide, an arylaluminum diaryloxide, etc. Diethylaluminum ethoxide is particularly preferred of them.

These alkoxy-containing aluminum compounds of formula (6) can be used either individually or as a mixture of two or more thereof.

The aluminum compounds of formula (6) can be used in combination with a trialkylaluminum, such as trimethylaluminum, a triethylaluminum, and triisobutylaluminum, in an arbitrary mixing ratio.

In particular, a combination of a dialkylaluminum alkoxide and a trialkylaluminum, especially a combination of diethylaluminum ethoxide and triethylaluminum is preferred.

Compound [B] is added in an amount of 0.0001 to 10,000 nmol, preferably 0.001 to 5,000 nmol, still preferably 0.01 to 1,000 nmol, per gram of the polymer produced and discharged from the reactor.

While the amount of component [B] is not governed by the amount of the compound [a5] if added nor by the amount of component [a1], it is desirably 0.001 to 100 mol, particularly 0.01 to 10 mol per mole, of component [a5] or 0.01 to 10,000 mol, particularly 0.1 to 1,000 mol, per mole of component [a1].

Component [B] is usually fed to the circulation line including the reactor where polymerization is carried out, but the manner of feeding is not particularly limited. For example, any of the following feeding methods can be adopted.

(1) Component [B] is fed to the circulation line of the reactor.
(2) Component [B] is fed to a raw material feed line of the reactor.
(3) Component [B] is fed to a line feeding transition metal-containing metallocene catalyst.
(4) Component [B] is previously added to transition metal-containing metallocene catalyst.
(5) Component [B] is fed to a line feeding component [a5].
(6) The above methods (1) to (5) are combined.

<Preliminary Polymerization>

The metallocene catalyst used in the invention can have been treated by preliminary polymerization of an α-olefin, e.g., ethylene, propylene, 1-butene, 1-hexene, 1-octene, 4-methyl-1-pentene, etc., or a mixture thereof. Preliminary polymerization is preferably carried out to such a degree that 0.01 to 1,000 g of a polymer is produced per gram of the catalyst.

<Polymerization>

Olefin polymerization according to the invention can be conducted in the presence of the above-described catalyst system by gas phase polymerization, bulk polymerization, slurry polymerization and the like. Where the reaction medium is liquid or a supercritical fluid, the polymerization is to be bulk polymerization or slurry polymerization. Where the medium is gas, the polymerization is to be gas phase polymerization.

The difficulty in these olefin polymerization systems we have often encountered is that the polymer produced or fine powder adheres to the wall or the stirring blade of a reactor by electrostatic force, etc. and remains there. Further, because of the presence of the catalyst, the polymer melts on the wall or the stirring blade to form a sheet-like polymer or a massive polymer. The sheet-like or massive polymer is liable to clog the product discharge line, which comes to be a great hindrance to stable supply of the product in long-term continuous operations.

It is a prerequisite for formation of a sheet-like or massive polymer that the polymer or powder adheres and remains onto the wall or the stirring blade. Whether such a phenomenon is developing or not can be monitored by reading a difference between the wall temperature and the polymerization temperature from a wall thermometer fitted to the reactor. Where a good deal of the polymer adheres thick, the wall temperature decreases to show a large difference from the polymerization temperature. Where the adhesion of the polymer is not much, the temperature drop is small to show a small temperature difference. Accordingly, monitoring the temperature difference makes it possible to detect the condition for sheet-like or massive polymer formation in its early stages.

In addition, in case a sheet-like polymer or a massive polymer should be formed, a rise in wall temperature results, which is also a measure for detecting the trouble.

Since heat is dissipated from the wall of the reactor, the wall temperature (Tw; °C.) is usually lower than the polymerization temperature (Tr; °C.). In order to continue operation stably, it is required that the difference between the polymerization temperature and the wall temperature be greater than 0.5 and smaller than 10, i.e., $0.5 < Tr - Tw < 10$, preferably $1.0 < Tr - Tw < 7.0$.

<Fluidized Bed Reactor>

An illustrative example of the process according to the invention will be described by referring to FIG. 2, in which olefin is polymerized in a gas phase using a gaseous circulating medium. Component [A] is fed to a stirred fluidized bed reactor 2 through a catalyst feed line 1. To start polymerization, a monomer or an inert gas (e.g., nitrogen) is fed to a circulating gas line 3 through a raw material feed line 4, and component [B] is fed to the line 3 through a separate line 5. A circulation gas compressor 7 is operated to circulate these gases. Ultimately, the circulating gas is again supplied to the stirred fluidized bed reactor 2.

The product and surplus gas are sent to a product separator 10 from a discharge line 9. The product is discharged continuously or intermittently through a product discharge line 12 provided at the bottom of the separator 10, and the surplus gas is purged out of the system through a purge line 11 provided at the top of the separator 10. The pressure in the reactor is maintained constant by adjusting the pressure-control valve set on the purge line 11.

In the reactor is formed a fluidized bed of particles previously put therein or polymer particles produced and flowing gas comprising the monomer(s), the inert gas, etc. by mechanical stirring with a stirring blade 6. The stirring blade 6 is driven by a motor 14.

The reactor 2 is equipped with a thermometer 13 for measuring the wall temperature thereby to monitor the difference between the polymerization temperature and the wall temperature. The thermometer is preferably set 0.5 to 10.0 mm away from the wall.

The fluidizing gas comprises 5 to 90% by volume of the inert gas and 10 to 95% by volume of the monomer (s), such as ethylene and α-olefins. The heat of polymerization is removed by a heat exchanger 8 set on the circulating gas line. The polymerization is performed under a pressure of 1 to 100 kg/cm$^2$, preferably 5 to 50 kg/cm$^2$, at a temperature of 10 to 100° C., preferably 30 to 100° C., still preferably 50 to 100° C.

The stirring blade which can be used in the stirred fluidized bed reactor 2 includes a ribbon blade, an anchor impeller, and a screw. Two or more polymerization reactors like the one shown in FIG. 2 may be connected in series to perform multi-stage polymerization.

Figure 1:
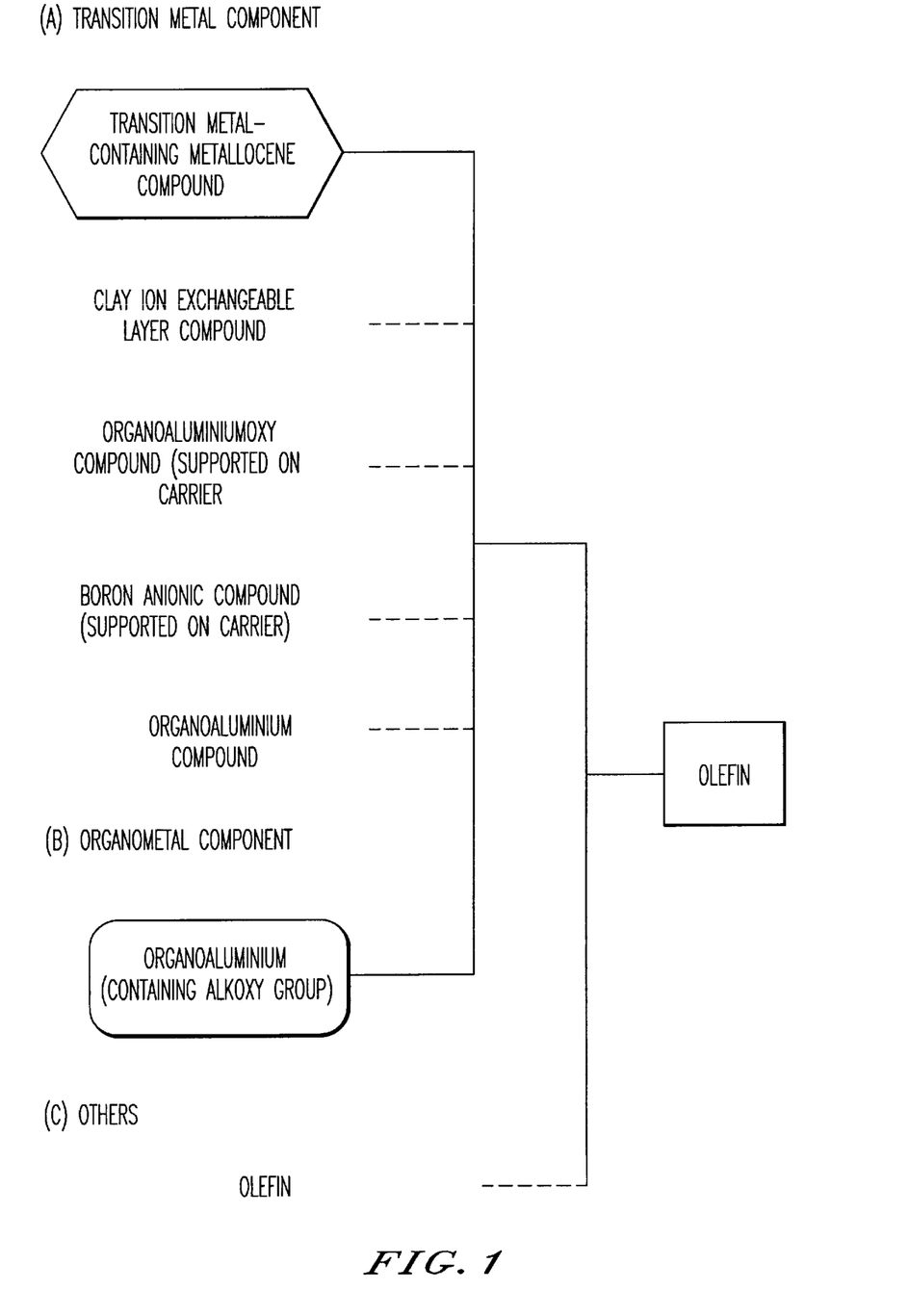
FIG. 1 is a flowchart helpful for understanding the invention.
Figure 2:
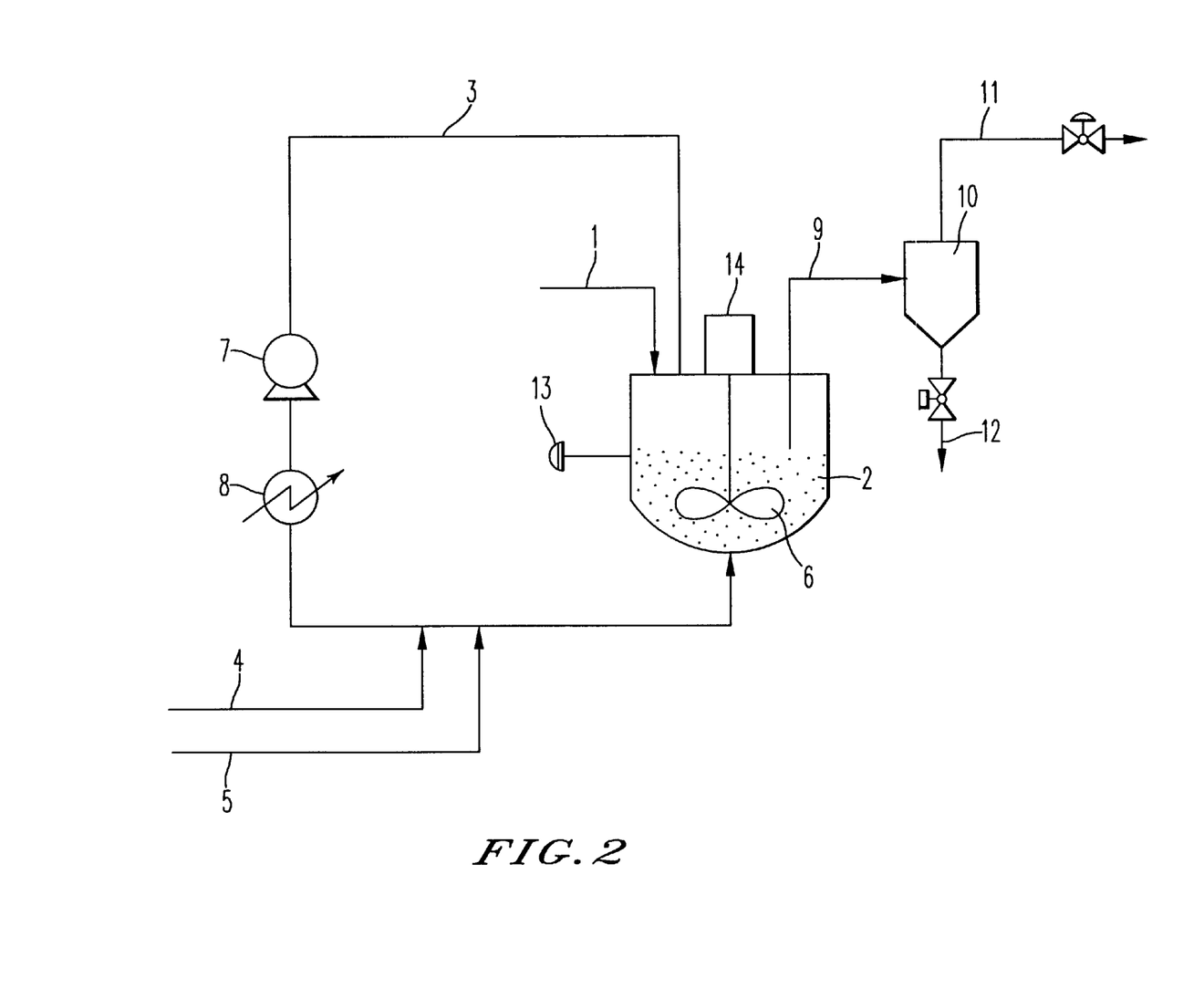
FIG. 2 is a flowchart showing the reaction system using a fluidized bed reactor, which can be used for carrying out the invention.

A fluidized bed other than the stirred fluidized bed as the one shown in FIG. 2 can be employed. For example, a distributor plate can be used in introducing a circulating gas to the reactor to form a gas phase fluidized bed.

The olefins which can be polymerized by the process of the invention preferably include α-olefins having 2 to 18 carbon atoms, such as ethylene, propylene, 1-butene, 1-pentene, 1-hexene, 4-methyl-1-pentene, 3-methyl-1-pentene, 1-heptene, 1-octene, 1-nonene, 1-decene, 1-undecene, 1-dodecene, 1-tetradecene, 1-hexadecene, and 1-octadecene. In addition, cyclopentene, cycloheptene, norbornene, 5-methyl-2-norbornene, styrene, vinylcyclohexane, and the like can also be polymerized.

These olefins are homo- or copolymerized or, copolymerized with polyenes, such as butadiene, isoprene, 1,4-hexadiene, dicyclopentadiene, and 5-ethylidene-2-norbornene. The process of the invention is preferably applied to homopolymerization of ethylene or copolymerization of ethylene and an α-olefin having 3 to 18 carbon atoms (especially copolymerization of ethylene and an α-olefin having 3 to 18 carbon atoms) or homopolymerization of propylene or copolymerization of propylene, ethylene, and/or an α-olefin having 4 to 18 carbon atoms.

In addition to the ethylene and other α-olefins used as monomers, an inert gas, such as nitrogen or saturated hydrocarbons, can be used in the polymerization.

Where an α-olefin or an unsaturated hydrocarbon having a high dew point is used, while the circulating gas is condensed in the heat exchanger 8 in some cases, the polymerization temperature in the fluidized bed reactor 2 is selected so that such an α-olefin or an unsaturated hydrocarbon can be gasified.

In the present invention, the melt index (MI) and the density of the polymer produced were measured in accordance with JIS K7210 and JIS K7112, respectively. The gas concentrations in the reaction system were measured by gas chromatography. Measurement of ethylene and 1-hexene concentrations was made with Model 163 manufactured by Hitachi, Ltd. Measurement of a hydrogen concentration was made with Model 4C manufactured by Shimadzu Corp. (TCD system) or Model 263-30 manufactured by Hitachi, Ltd. (FID system), depending on the hydrogen concentration.

EXAMPLES

While the present invention will be explained with examples below, the present invention is not limited to these examples.

EXAMPLE 1

(1) Chemical Treatment of Clay Mineral

Commercially available expansible synthetic mica "Somashif ME-100" produced by Co-op Chemical Co., Ltd. (400 g) and commercially available hydrophilic smectite "SWN" produced by Co-op Chemical Co., Ltd. (100 g) were mixed and dispersed in 2.8 l of a 2.0 wt % aqueous solution of chromium (III) nitrate and stirred at ambient temperature for 2 hours. The dispersion was filtered, and the cake was washed with desalted water. The resulting solid was dispersed in water in a concentration of 20.0 wt %, followed by spray drying to obtain 450 g of particles having an average particle size of 54 μm. The proportion of particles having an average diameter of 10 μm or smaller in the total particles was 4% in number. The resulting particles had a compressive strength of 2.0 MPa and a bulk density of 0.75 g/cc. The particles were further dried in vacuo at 200° C. for 2 hours.

(2) Preparation of Catalyst

In a 10 l volume reactor equipped with an induction stirrer were put 4.4 l of n-heptane and 80 g of the synthetic mica particles prepared in (1) above. A solution of 6.4 mmol of bis(n-butylcyclopentadienyl)zirconium dichloride in 600 ml of toluene was added thereto, followed by stirring at room temperature for 10 minutes.

(3) Preliminary Polymerization

Subsequently, 71.5 mmol of triethylaluminum was added to the stirred mixture, and the temperature of the system was elevated to 60° C. Ten minutes later, ethylene gas was introduced and allowed to react for 2.5 hours to yield 547 g of polyethylene.

(4) Gas Phase Polymerization

Gas phase polymerization was carried out in a continuous gas phase polymerization reactor as shown in FIG. 2 by using the preliminary polymerization catalyst system. In the reactor was charged 1.1 kg of a seed polymer beforehand, and the above prepared catalyst was fed thereto as a slurry in n-hexane at a feed rate of 300 mg/hr in terms of the preliminary polymerization catalyst. At the same time, triethylaluminum diluted with n-hexane was fed to the reactor at a rate of 270 mg/hr. Then diethylaluminum ethoxide diluted with n-hexane was fed intermittently at a rate of 30 mg/hr. The reactor was operated under conditions of a pressure of 20 kg/cm$^2$, a temperature of 83° C., an average residence time of 3.7 hours, and a stirring speed of 150 rpm. The gas concentrations in the system were periodically measured by gas chromatography, and the gas feeds were adjusted after every measurement so that the ethylene concentration, 1-hexene concentration and hydrogen concentration should fall within ranges of 84.0 to 87.0 vol %, 3.3 to 3.5 vol %, and 180 to 210 ppm, respectively. In a steady state where the production rate was almost constant, the ethylene gas feed was 5.5 kg/hr, and the 1-hexene feed was 0.6 kg/hr. The operation was continued in a stable manner for consecutive 3 days under these conditions with no trouble in the discharge line. The difference between the polymerization temperature (Tr) and the wall temperature (Tw) was within a range of from 3.0 to 5.0° C. during the 3 days' polymerization. After completion of the polymerization, the reactor was opened and inspected to find neither formation of a sheet-like polymer or a massive polymer nor adhesion of the polymer to the inner wall.

The resulting polymer had a density of 0.926 g/cc, an MI of 1.6 g/10 min, an average particle size of 790 μm, and a bulk density of 0.38 g/cc.

Comparative Example 1

Polymerization of ethylene was carried out in the same manner as in Example 1, except that diethylaluminum ethoxide was not fed. The difference between the polymerization temperature and the wall temperature was 3.5° C. before the addition of the catalyst. When half a day had passed from the start of the polymerization, the difference between the polymerization temperature and the wall temperature began to increase. It increased to 11.5° C. in a day. As the operation was continued further, the thermometer occasionally showed an abrupt temperature rise, climbing up to 87° C. as the maximum. Besides, small molten polymer particles were observed in the polymer discharged. So the catalyst feed was suspended until no abrupt rise in wall temperature was observed. After a steady state was reached, feeding was resumed. However, every time feeding was resumed, the wall temperature rose, and discharge trouble finally forced us to shut down the operation. Thereafter, the reactor was opened and inspected to confirm formation of a massive polymer and adhesion of a large amount of a filmy polymer on the inner wall.

EXAMPLE 2

<Preparation of Catalyst and Preliminary Polymerization>

Twenty grams of M—$SiO_2$ (methylalumoxane carried on $SiO_2$; Al concentration: 22.3 wt %; produced by Witco, Germany) was slurried in 1 l of n-heptane. Bis(n-butylcyclopentadienyl)zirconium dichloride and triisobutyl aluminum (TiBA) were added to the slurry at a molar ratio of 1/250 and 1/6, respectively, to Al, followed by stirring at 40° C. for 10 minutes. Ethylene was introduced into the reactor while maintaining the reaction system at 40° C. to polymerize for 1 hour. The ethylene feed in terms of total weight was 8 times as much as M—$SiO_2$. After purging the reactor with nitrogen gas at room temperature for 12 hours, the catalyst was dried at room temperature under reduced pressure for 2 hours.

<Gas Phase Polymerization>

Continuous gas phase polymerization was carried out by using the above-mentioned preliminary polymerization catalyst prepared. In the reactor was charged 1.2 kg of a seed polymer beforehand to the same height as in Example 1, and the above prepared catalyst was fed thereto as a slurry in n-hexane at a feed rate of 210 mg/hr in terms of the preliminary polymerization catalyst. At the same time, triethylaluminum diluted with n-hexane was fed to the reactor at a rate of 100 mg/hr. The reactor was operated under conditions of a pressure of 20 kg/cm², a temperature of 80° C., an average residence time of 4.1 hours, and a stirring speed of 150 rpm. The gas concentrations in the system were periodically measured by gas chromatography, and the gas feeds were adjusted after every measurement so that the ethylene concentration, 1-butene concentration and hydrogen concentration should fall within ranges of 84.0 to 87.0 vol %, 3.0 to 3.5 vol %, and 210 to 240 ppm, respectively.

The difference between the polymerization temperature (Tr) and the wall temperature (Tw) was 3.5° C. before the catalyst feeding. The temperature difference began to increase from the start of the catalyst feeding and reached 10° C. or greater in a day. On further continuing the reaction for another half a day, the wall temperature occasionally jumped to exceed 80° C. while the polymerization temperature was kept at 80° C. Then diethylaluminum ethoxide diluted with n-hexane was fed intermittently at a rate of 34 mg/hr. It followed that the temperature jumping phenomenon was subdued, and the wall temperature began to rise gradually. After about one day had passed from the start of the intermittent feeding of diethylaluminum ethoxide, the temperature difference narrowed to 3.9° C. The system was stopped after 5-day continuous operation in total, and the reactor was inspected to find no formation of a molten polymer.

Comparative Example 2

<Gas Phase Polymerization>

Gas phase polymerization was carried out in a continuous gas phase polymerization reactor under the same reaction conditions as in Example 1, except for replacing diethylaluminum ethoxide, which was fed intermittently, with ethanol.

The difference between the polymerization temperature (Tr) and the wall temperature (Tw) was 3.4° C. before the catalyst was fed. As the temperature difference gradually increased with the progress of polymerization, ethanol feeding was started as follows. Ethanol was charged into a metal container, and the pressure inside the container was kept at 2 kg/cm² higher than the polymerization pressure at 25° C. Nitrogen was bubbled through the ethanol and sent to the reactor. Assuming that the nitrogen fed to the reactor had been saturated with ethanol vapor, the ethanol feed was 20 mg/hr. About 2 days later from ethanol feeding, the difference between the polymerization temperature and the wall temperature began to decrease. On further continuation of the operation, however, the wall temperature suddenly rose, climbing up to 98° C. as the highest. The operation was stopped because the polymer could no longer be discharged from the reactor. Thereafter, the reactor was opened and inspected to confirm formation of a massive polymer.

Industrial Applicability

According to the present invention, olefin polymerization in a fluidized bed reactor can be carried on stably for an prolonged period of time without suffering from operational trouble due to formation of a sheet-like polymer or a massive polymer. Hence, the process of the invention is extremely useful in industry.

What is claimed is:

1. A process for producing a polyolefin, comprising polymerizing an olefin in the presence of [A] a transition metal-containing metallocene catalyst and [B] an organoaluminum compound represented by formula:

$$R^1{}_nAl(OR^2)_{3-n},$$

wherein $R^1$ represents a $C_{1-20}$ alkyl group, an aryl group, hydrogen or halogen; $R^2$ represents a $C_{1-20}$ alkyl group or an aryl group; and n is a number selected from $0 \leq n < 3$, while maintaining a condition that the temperature of the wall of a polymerization reactor Tw (° C.) and the polymerization temperature Tr (° C.) satisfy the relationship of formula 1:

$$0.5 < Tr - Tw < 10 \qquad 1.$$

2. A process for producing a polyolefin according to claim 1, wherein the component [A]: transition metal-containing metallocene catalyst comprises [a1] a transition metal-containing metallocene compound and [a2] clay, clay mineral or an ion exchangeable layer compound.

3. A process for producing a polyolefin according to claim 1, wherein the component [A]: transition metal-containing metallocene catalyst comprises [a1] a transition metal-containing metallocene compound and [a3] an organoaluminium compound supported on a carrier.

4. A process for producing a polyolefin according to claim 1, wherein the component [A]: transition metal-containing metallocene catalyst comprises [a1] a transition metal-containing metallocene compound and [a4] a boron anionic compound supported on a carrier.

5. A process for producing a polyolefin according to claim 1, wherein the addition amount of the component [B]:

organoaluminum compound is from 0.0001 nmol to 10,000 nmol per gram of the estimated amount of the olefin polymer produced.

6. A process for producing a polyolefin according to claim 1, wherein the component [A]: transition metal-containing metallocene catalyst contains the following component [a5]: an organoaluminum compound represented by formula:

$$R^3_m AlX_{3-m} \quad [a5]$$

wherein $R^3$ represents a C1–20 alkyl group; X represents hydrogen, halogen, an alkoxy group, an alkylsilyl group, an alkylsiloxy group, an alkylamino group or an alkylamido group; and m represents a number selected from 0<m<3.

7. A process for producing a polyolefin according to claim 1, wherein the component [A]: transition metal-containing metallocene catalyst has been treated by preliminary polymerization of an α-olefin.

8. A process for producing a polyolefin according to claim 1, wherein the olefin is gaseous in the polymerization system.

9. The process for producing a polyolefin as claimed in claim 1, further comprising adding component [B] to a circulation line including the reactor.

10. The process for producing a polyolefin as claimed in claim 1, wherein the condition to satisfy the relationship of formula 1 is maintained by an amount of component [B] added.

11. The process for producing a polyolefin as claimed in claim 10, wherein the condition to satisfy the relationship of formula 1 is maintained by dissipating heat from the polymerization reactor.

* * * * *